(12) United States Patent
Ho

(10) Patent No.: US 9,903,103 B2
(45) Date of Patent: Feb. 27, 2018

(54) TUB FAUCET

(71) Applicant: Chin-Hua Ho, Changhua (TW)

(72) Inventor: Chin-Hua Ho, Changhua (TW)

(73) Assignee: Chyi Liou Enterprise Co., Ltd., Changhua (TW)

( * ) Notice: Subject to any disclaimer, the term of this patent is extended or adjusted under 35 U.S.C. 154(b) by 167 days.

(21) Appl. No.: 15/081,938

(22) Filed: Mar. 28, 2016

(65) Prior Publication Data

US 2016/0208466 A1    Jul. 21, 2016

(51) Int. Cl.
*E03C 1/04*        (2006.01)
*F16K 11/00*       (2006.01)

(52) U.S. Cl.
CPC .............. *E03C 1/0408* (2013.01); *E03C 1/04* (2013.01); *E03C 1/0412* (2013.01); *F16K 19/006* (2013.01); *E03C 2201/30* (2013.01)

(58) Field of Classification Search
CPC .. E03C 1/0408; E03C 1/0412; E03C 2201/30; F16K 19/006
See application file for complete search history.

(56) References Cited

U.S. PATENT DOCUMENTS

RE30,559 E  *  3/1981  Schmitt .................. F16K 11/22
                                              137/315.12
7,121,303 B1 * 10/2006 Hwang .................. E03C 1/042
                                              134/198

* cited by examiner

*Primary Examiner* — Ryan A Reis

(57) ABSTRACT

A tub faucet includes a first shell; a second shell; a cross-shaped first coupling including a tubular member having two sets of two opposite wells at two ends respectively, an externally threaded first tube, an externally threaded second tube; two T-shaped second couplings each including an externally threaded inlet, a tubular first joining member, the first joining member having two opposite tabs on an outer surface, and an externally threaded, tubular second joining member; two knobs rotatably secured to the second joining members respectively; and a spout threadedly secured to the second tube, the spout having a stem configured to open or close the spout. The first joining members are secured to two ends of the tubular member respectively with the tabs inserted into the wells respectively. The first and second shells are complimentarily fastened together with the first and second couplings partially disposed therein.

1 Claim, 6 Drawing Sheets

TUB FAUCET

BACKGROUND OF THE INVENTION

1. Field of the Invention

The invention relates to faucets and more particularly to a tub faucet having improved characteristics.

2. Description of Related Art

A conventional tub faucet comprises a cold water valve; a hot water valve; a convergent pipe disposed between the cold water switch and the hot water switch; a first support pipe connected to the convergent pipe; a faucet secured to the first support pipe; a second support pipe secured to the convergent pipe such that the second support pipe is connected to a shower head via a guide tube; a fastening hole within the faucet and in the inner wall provided with an annular groove and a washer in the annular groove; a connection portion in a top edge of the interior of the faucet and provided with a through hole and an inner threaded portion which are coaxial with the fastening hole; an internal pipe in the first support pipe and in an inner wall provided with a stepped edge and in a periphery provided with water stepping rings in intimate contact with the inner wall of the first support pipe, the internal pipe further comprising a water hole in communication with the interior of the faucet, and an outer threaded portion engaged the inner threaded portion of the connection portion; a pull rod reciprocally disposed in the interior of the internal pipe, the pull rod comprising an annular protrusion having a water stopping ring, and a spring biased between the annular protrusion of the pull rod and the stepped edge of the internal pipe; and a locating edge on the outer wall of the first support pipe for positioning the faucet by a bolt whereby the bolt presses the locating edge.

While the device enjoys its success in the market, continuing improvements in the exploitation of tub faucet of this type are constantly being sought.

SUMMARY OF THE INVENTION

It is therefore one object of the invention to provide a tub faucet comprising a first shell including two spaced, concave portions on a first edge, two concave members at two ends respectively, and an intermediate concave section on a second edge; a second shell including two spaced, concave portions on a first edge, two concave members at two ends respectively, and an intermediate concave section on a second edge; a cross-shaped first coupling including a tubular member having two sets of two opposite wells at two ends respectively, an externally threaded first tube perpendicular to the tubular member and communicating therewith, an externally threaded second tube perpendicular to the tubular member, aligned with the first tube, and communicating with both the first tube and the tubular member; two T-shaped second couplings each including an externally threaded inlet, a tubular first joining member perpendicular to the inlet and communicating therewith, the first joining member having two opposite tabs on an outer surface, and a holed projection on the outer surface and extending parallel to the first joining member, and an externally threaded, tubular second joining member aligned with the first joining member and communicating with both the first joining member and the inlet; two knobs rotatably secured to the second joining members respectively; and a spout threadedly secured to the second tube, the spout having a stem configured to open or close the spout; wherein the first joining members are secured to two ends of the tubular member respectively with the tabs inserted into the wells respectively, the first and second shells are complimentarily fastened together with the first and second couplings partially disposed therein, and water is configured to flow to the second couplings prior to flowing out of the first coupling and/or the spout.

The above and other objects, features and advantages of the invention will become apparent from the following detailed description taken with the accompanying drawings.

DETAILED DESCRIPTION OF THE INVENTION

Figure 1:
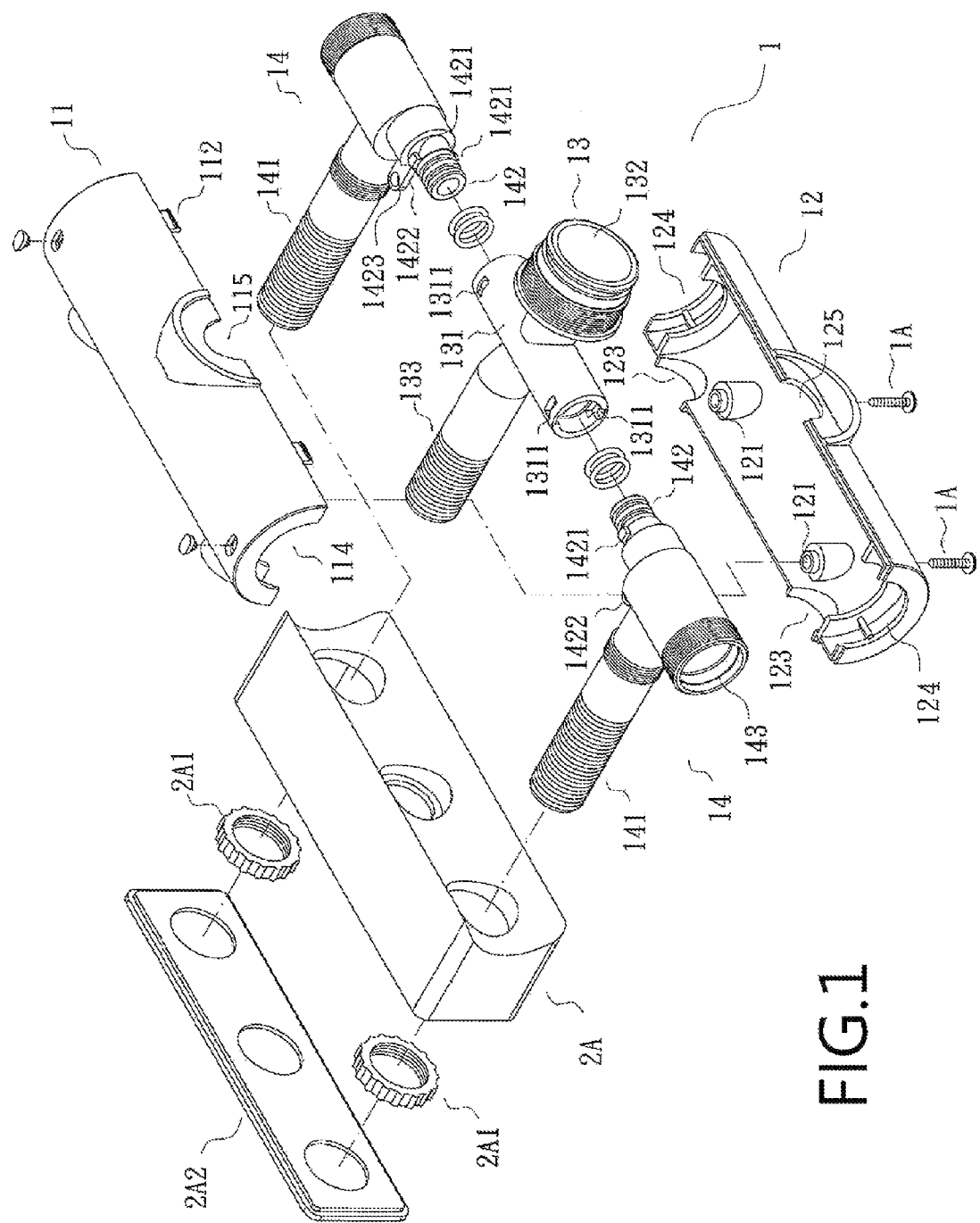
FIG. 1 is a perspective view of a tub faucet according to the invention.
Figure 2:
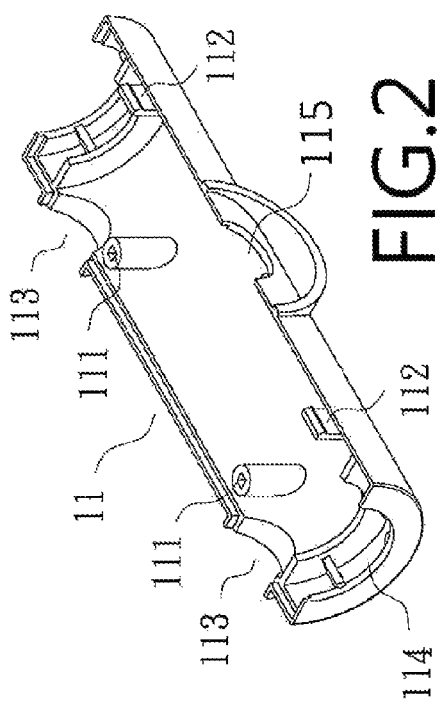
FIG. 2 is a perspective view of the first shell.
Figure 3:
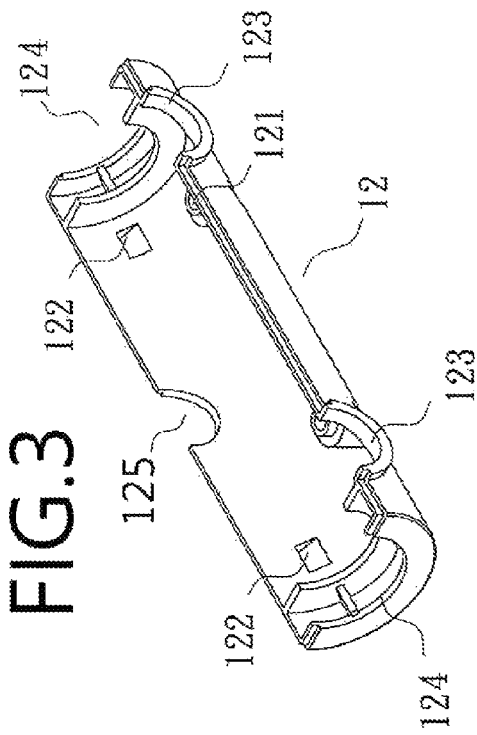
FIG. 3 is a perspective view of the second shell.
Figure 4:
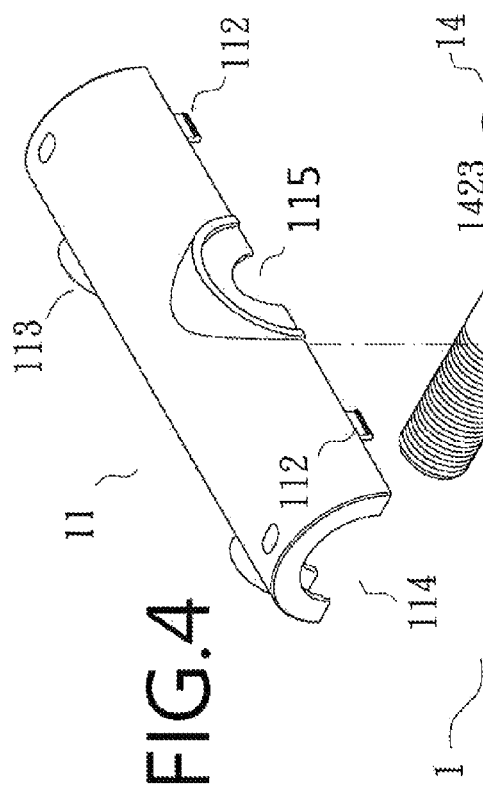
FIG. 4 is an exploded perspective view showing the first shell to be mounted on the assembled first coupling, the second couplings, and the second shell.
Figure 4:
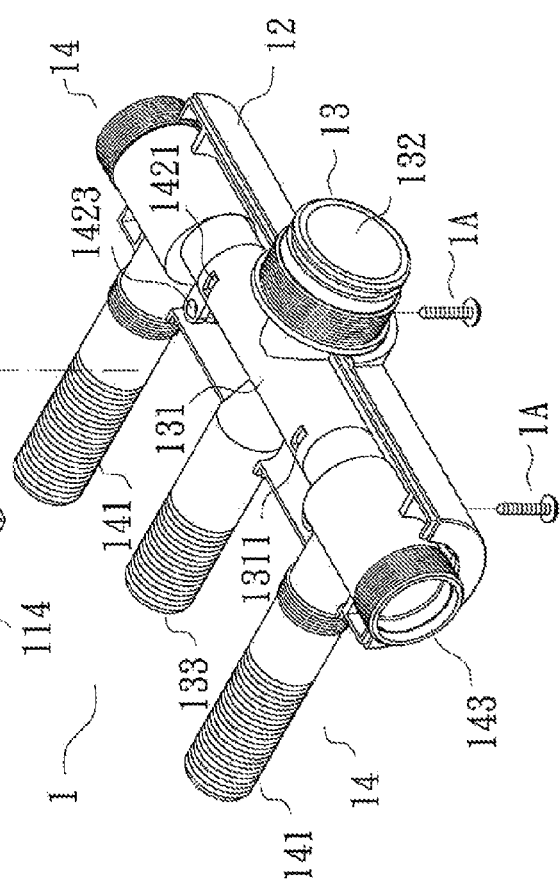
Figure 5:
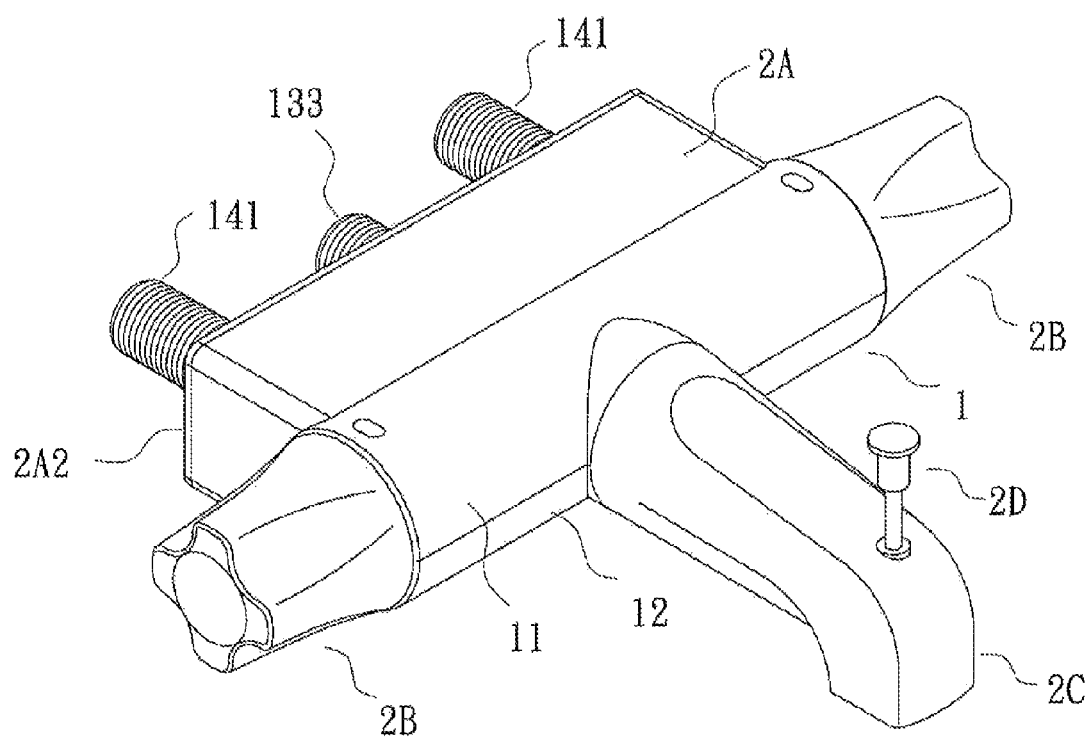
FIG. 5 is a perspective view of the assembled tub faucet.
Figure 7:
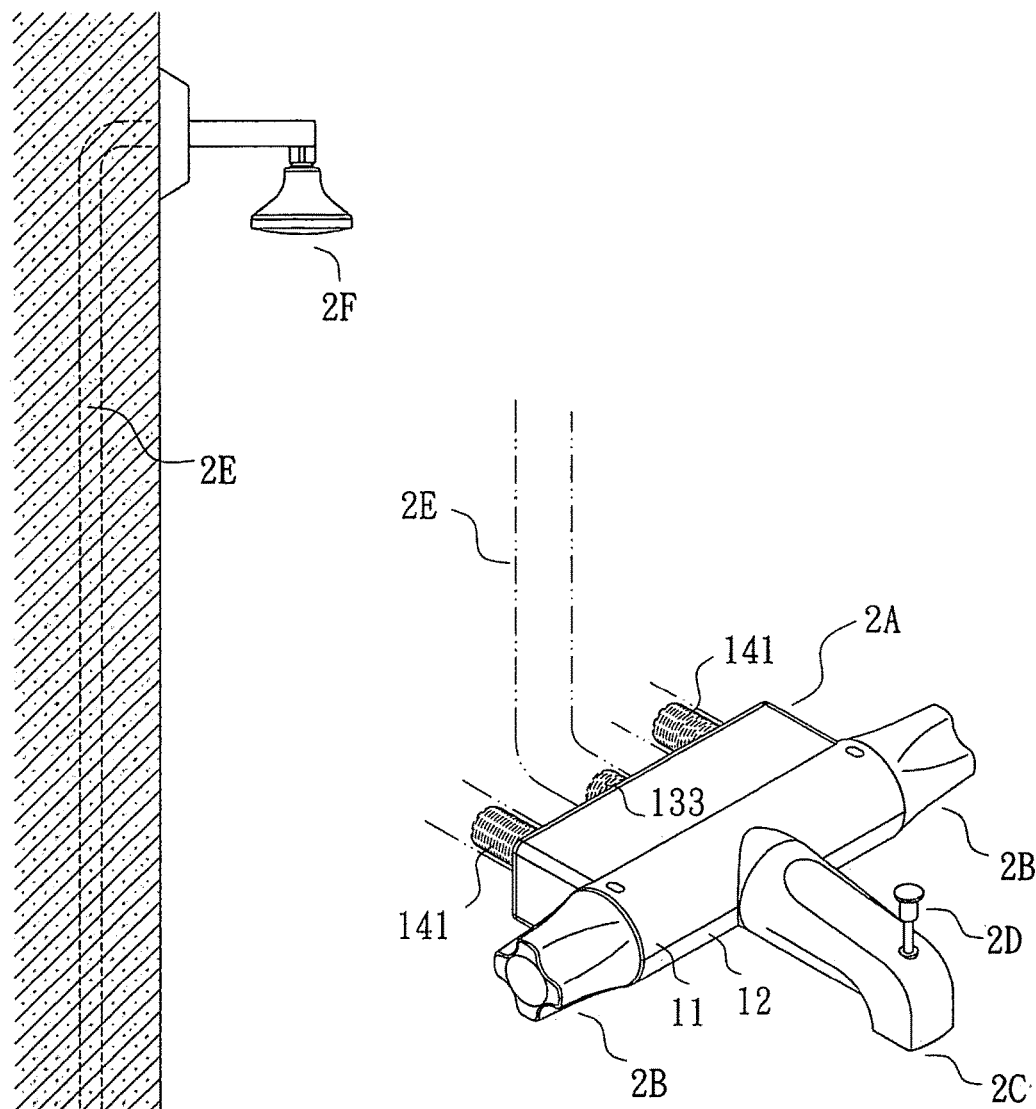
FIG. 7 is a perspective view of the tub faucet connected to the pipes.
Figure 6:
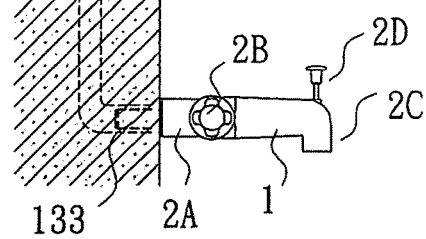
FIG. 6 is a side view schematically showing the tub faucet connected to a shower.
Figure 8:
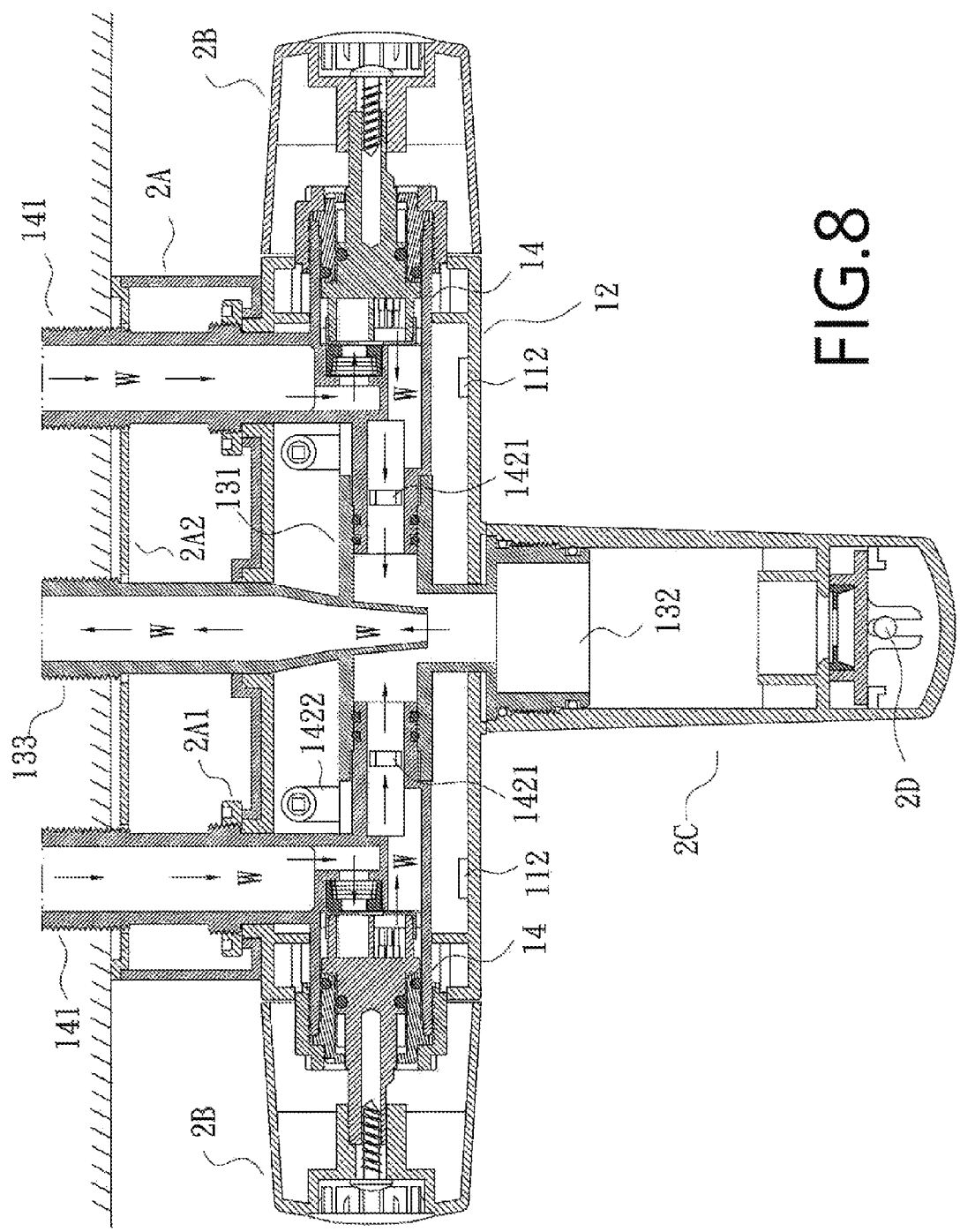
FIG. 8 is a cross-sectional view of the assembled tub faucet.
Figure 9:
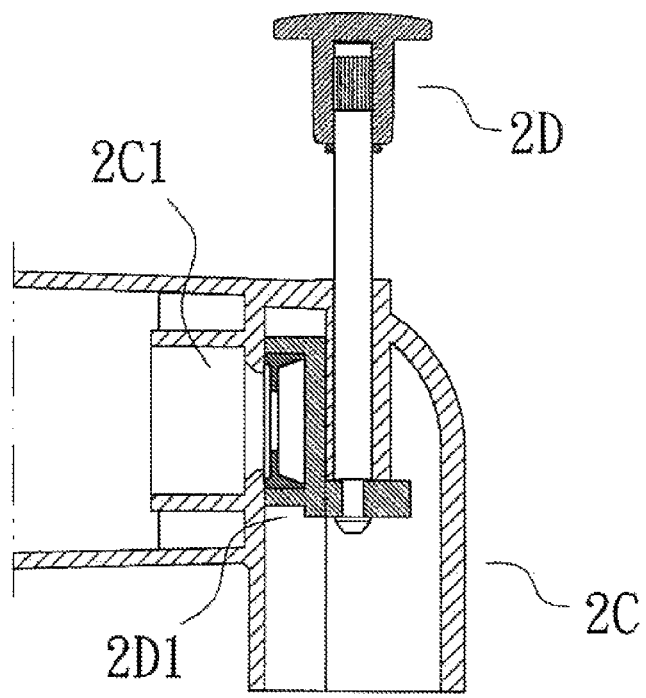
FIG. 9 is a longitudinal sectional view of the spout showing the stem being lifted to block the fluid flow.
Figure 10:
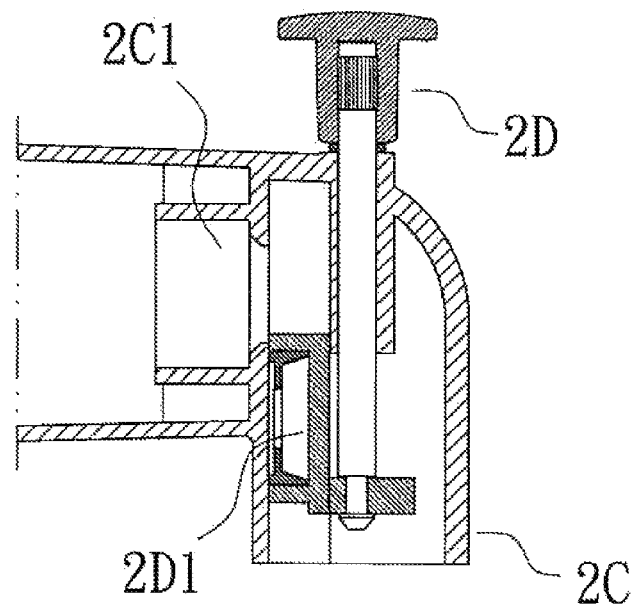
FIG. 10 is a view similar to FIG. 9 showing the stem being pushed down to allow the fluid to flow out of the spout.

Referring to FIGS. 1 to 10, a tub faucet 1 in accordance with the invention comprises a first shell 11, a second shell 12, a first coupling 13, two second couplings 14, an escutcheon 2A, two knobs 2B, a spout 2C, and a stem 2D.

The first shell 11 includes two spaced, bossed, threaded holes 111 on an inner surface, two spaced latches 112 on the inner surface, two spaced, concave portions 113 on one edge, two concave members 114 at two ends respectively, and an intermediate concave section 115 on the other edge.

The second shell 12 is a mating member of the first shell 11 and includes two spaced, bossed, threaded holes 121 on an inner surface, two spaced cavities 122 on the inner surface, two spaced, concave portions 123 on one edge, two concave members 124 at two ends respectively, and an intermediate concave section 125 on the other edge.

The first coupling 13 is shaped as a cross and includes a tubular member 131 having two sets of two opposite wells 1311 at two ends respectively, an externally threaded first tube 132 perpendicular to the tubular member 131 and communicating therewith, and an externally threaded second tube 133 perpendicular to the tubular member 131, aligned with the first tube 132, and communicating with both the first tube 132 and the tubular member 131.

The second coupling 14 is shaped as a T and includes an externally threaded inlet 141; a tubular first joining member 142 perpendicular to the inlet 141 and communicating therewith, a, the first joining member 142 having two opposite tabs 1421 on an outer surface, a projection 1422 on the outer surface and extending parallel to the first joining member 142, and a hole 1423 through the projection 1422; and an externally threaded, tubular second joining member 143 aligned with the first joining member 142 and communicating with both the first joining member 142 and the inlet 141.

In assembly, the first joining members 142 are secured to two ends of the tubular member 131 respectively with the tabs 1421 inserted into the wells 1311 respectively. Further, two O-rings (not numbered) are mounted on the joining portion of the corresponding first joining member 142 for preventing fluid from leaking. The first shell 11 and the second shell 12 are put on upper and lower portions of the assembled first coupling 13 and the second couplings 14 respectively in which the latches 112 are in the cavities 122 respectively, the second joining members 143 are partially disposed above the concave members 124 and partially disposed under the concave members 114, and the first tube 132 is partially disposed above the concave section 125 and partially disposed under the concave section 115, and the inlet 141 passes through the corresponding, complimentary concave portions 113 and 123.

Further, threaded fasteners (e.g., screws) 1A are driven through the threaded holes 121, the holes 1423, and the threaded holes 111 to fasten the first shell 11, the second shell 12, and the already fastened second shell 13 and the second couplings 14 together. The second couplings 14 pass through two holes (not numbered) of an escutcheon 2A, two nuts 241 and two holes (not numbered) of a mounting plate 2A2; and the first coupling 13 further passes through another hole (not numbered) of the escutcheon 2A and another hole (not numbered) of the mounting plate 2A2 in which the nuts 2A1 are secured to the inlets 141 respectively. Two knobs 2B are threadedly secured to the second joining members 143 respectively. A spout 2C is threadedly secured to the first tube 132. A stem 2D is adjustably, partially disposed in the spout 2C. A pipe 2E has one end connected to a shower head 2F and the other end connected to the second tube 133. This finishes the assembly of the invention.

In use, an individual may rotate one knob 2B to adjust cold water (as indicated by arrows and reference numerals W in FIG. 8) flowing to the first coupling 13 via one second coupling 14 and/or rotate the other knob 2B to adjust hot water (as indicated by arrows and reference numerals W in FIG. 8) flowing to the first coupling 13 via the other second coupling 14. The hot water and the cold water are mixed prior to either flowing to the shower head 2F via the pipe 2E (as indicated by arrows and reference numerals W in FIG. 8) or flowing to the spout 2C. Further, the individual may lift the stem 2D to cause a valve member 2D1 to block a port 2C1 so as to prevent water from flowing out of the spout 2C (see FIG. 9) or press down the stem 2D to cause the valve member 2D1 to clear out of the port 2C1 so as to allow water to flow out of the spout 2C through the port 2C1 (see FIG. 10).

While the invention has been described in terms of preferred embodiments, those skilled in the art will recognize that the invention can be practiced with modifications within the spirit and scope of the appended claims.

What is claimed is:

1. A tub faucet comprising:
    a first shell including two spaced, concave portions on a first edge, two concave members at two ends respectively, and an intermediate concave section on a second edge;
    a second shell including two spaced, concave portions on a first edge, two concave members at two ends respectively, and an intermediate concave section on a second edge;
    a cross-shaped first coupling including a tubular member having two sets of two opposite wells at two ends respectively, an externally threaded first tube perpendicular to the tubular member and communicating therewith, an externally threaded second tube perpendicular to the tubular member, aligned with the first tube, and communicating with both the first tube and the tubular member;
    two T-shaped second couplings each including an externally threaded inlet, a tubular first joining member perpendicular to the inlet and communicating therewith, the first joining member having two opposite tabs on an outer surface, and a holed projection on the outer surface and extending parallel to the first joining member, and an externally threaded, tubular second joining member aligned with the first joining member and communicating with both the first joining member and the inlet;
    two knobs rotatably secured to the second joining members respectively; and
    a spout threadedly secured to the second tube, the spout having a stem configured to open or close the spout;
    wherein the first joining members are secured to two ends of the tubular member respectively with the tabs inserted into the wells respectively, the first and second shells are complimentarily fastened together with the first and second couplings partially disposed therein, and water is configured to flow to the second couplings prior to flowing out of at least one of the first coupling and the spout.

* * * * *